(12) United States Patent
Nitsch et al.

(10) Patent No.: US 11,116,145 B2
(45) Date of Patent: Sep. 14, 2021

(54) AUTOMATED OPTIMIZATION OF AGRICULTURAL TREATMENTS BASED ON RASTER IMAGE DATA SYSTEM

(71) Applicant: Greensight Agronomics, Inc., Boston, MA (US)

(72) Inventors: William D. Nitsch, Brighton, MA (US); James R. Peverill, Milpitas, CA (US); David A. Strohschein, Newburyport, MA (US)

(73) Assignee: Greensight Argonomics, Inc., Boston, MA (US)

( * ) Notice: Subject to any disclaimer, the term of this patent is extended or adjusted under 35 U.S.C. 154(b) by 65 days.

(21) Appl. No.: 16/367,835

(22) Filed: Mar. 28, 2019

(65) Prior Publication Data
US 2019/0387687 A1    Dec. 26, 2019

Related U.S. Application Data

(60) Provisional application No. 62/650,796, filed on Mar. 30, 2018.

(51) Int. Cl.
*A01G 7/06*    (2006.01)
*G06K 9/00*    (2006.01)
(Continued)

(52) U.S. Cl.
CPC .............. *A01G 7/06* (2013.01); *A01C 21/005* (2013.01); *A01C 21/007* (2013.01);
(Continued)

(58) Field of Classification Search
CPC ...... A01G 7/06; G06K 9/00657; G06K 9/627; G06K 9/6256; G06T 7/0012;
(Continued)

(56) References Cited

U.S. PATENT DOCUMENTS 7,184,859 B2    2/2007    Hood et al.
7,610,122 B2   10/2009    Anderson
(Continued)

FOREIGN PATENT DOCUMENTS

DE    202015102833 U1    10/2015
WO    WO 2017/077543 A1    5/2017

OTHER PUBLICATIONS

Bagheri et al., "Multispectral Remote Sensing for Site-Specific Nitrogen Fertilizer Management," Pesquisa Agropecuaria Brasileira, vol. 48, No. 10, pp. 1394-1401, 2013.
(Continued)

*Primary Examiner* — Jaime M Holliday
(74) *Attorney, Agent, or Firm* — Patterson Thuente Pedersen, P.A.

(57) ABSTRACT

Systems and methods to collect, combine, store, and process remote sensing and imaging information as well for agricultural area as a raster image data system for handling both remotely-sensed aerial image data and land-based sensor data, as well as previous agricultural treatments, in order to optimize future agricultural treatments to variable resolutions of the area of vegetation corresponding to that represented by a pixel in a raster image data system of the area.

20 Claims, 9 Drawing Sheets

(51) Int. Cl.

| | | |
|---|---|---|
| *G06T 7/00* | (2017.01) | |
| *A01M 7/00* | (2006.01) | |
| *A01C 21/00* | (2006.01) | |
| *A01C 23/00* | (2006.01) | |
| *G06K 9/62* | (2006.01) | |

(52) U.S. Cl.
CPC ......... *A01C 23/007* (2013.01); *A01M 7/0089* (2013.01); *G06K 9/00657* (2013.01); *G06T 7/0012* (2013.01); *G06K 9/627* (2013.01); *G06K 9/6256* (2013.01); *G06T 2207/10032* (2013.01); *G06T 2207/20081* (2013.01); *G06T 2207/30188* (2013.01)

(58) Field of Classification Search
CPC . G06T 2207/30188; G06T 2207/20081; G06T 2207/10032; A01M 7/0089; A01C 21/005; A01C 23/007; A01C 21/007
See application file for complete search history.

(56) References Cited

U.S. PATENT DOCUMENTS

| | | | |
|---|---|---|---|
| 8,712,148 | B2 | 4/2014 | Paris et al. |
| 9,302,770 | B2 | 4/2016 | Burgess et al. |
| 9,382,003 | B2 | 7/2016 | Burema et al. |
| 9,387,928 | B1 | 7/2016 | Gentry et al. |
| 9,389,298 | B2 | 7/2016 | Smitherman |
| 9,505,494 | B1 | 11/2016 | Marlow et al. |
| 9,519,861 | B1 | 12/2016 | Gates et al. |
| 9,619,776 | B1 | 4/2017 | Ford |
| 9,638,678 | B2 | 5/2017 | Shriver et al. |
| 9,734,400 | B2 | 8/2017 | Shriver |
| 9,756,844 | B2 | 9/2017 | Groeneveld |
| 9,791,316 | B2 | 10/2017 | Ritter et al. |
| 9,792,557 | B2 | 10/2017 | Mathur et al. |
| 9,922,405 | B2 | 3/2018 | Sauder et al. |
| 2009/0271719 | A1 | 10/2009 | Clare et al. |
| 2011/0061764 | A1 | 3/2011 | Springer |
| 2011/0121020 | A1 | 5/2011 | Springer |
| 2012/0101634 | A1* | 4/2012 | Lindores .............. A01B 79/005 700/266 |
| 2013/0118639 | A1 | 5/2013 | Springer |
| 2014/0032034 | A1 | 1/2014 | Raptopoulos et al. |
| 2014/0303814 | A1 | 10/2014 | Burema et al. |
| 2016/0039300 | A1 | 2/2016 | Wang et al. |
| 2016/0048137 | A1 | 2/2016 | Phillips et al. |
| 2016/0050840 | A1 | 2/2016 | Sauder et al. |
| 2016/0086032 | A1 | 3/2016 | Pickett |
| 2016/0133039 | A1 | 5/2016 | Ritter et al. |
| 2016/0144734 | A1 | 5/2016 | Wang et al. |
| 2016/0239709 | A1* | 8/2016 | Shriver .............. G06K 9/00657 |
| 2016/0307448 | A1 | 10/2016 | Salnikov et al. |
| 2016/0328827 | A1 | 11/2016 | Ilic et al. |
| 2016/0334276 | A1 | 11/2016 | Pluvinage |
| 2017/0129605 | A1 | 5/2017 | Wu et al. |
| 2017/0131254 | A1 | 5/2017 | Shriver et al. |
| 2017/0190260 | A1 | 7/2017 | Wang et al. |
| 2017/0223889 | A1 | 8/2017 | Cavender-Bares |
| 2017/0253349 | A1 | 9/2017 | Wang et al. |
| 2017/0336203 | A1 | 11/2017 | Barnes et al. |
| 2018/0099747 | A1 | 4/2018 | Peng et al. |
| 2018/0118340 | A1 | 5/2018 | Russo |
| 2018/0293444 | A1* | 10/2018 | Buoro .................. G06K 9/6289 |
| 2019/0026896 | A1 | 1/2019 | Kluckner et al. |
| 2019/0031346 | A1 | 1/2019 | Yong et al. |
| 2019/0066234 | A1* | 2/2019 | Bedoya .................. G06Q 50/02 |
| 2019/0073534 | A1* | 3/2019 | Dvir .................. G06K 9/00657 |
| 2019/0082650 | A1 | 3/2019 | Lepek et al. |
| 2019/0114481 | A1* | 4/2019 | DeChant ................ G06N 3/084 |
| 2019/0144097 | A1 | 5/2019 | Benson et al. |
| 2019/0265735 | A1 | 8/2019 | Ishikawa et al. |
| 2019/0389577 | A1 | 12/2019 | Jones et al. |
| 2019/0392211 | A1 | 12/2019 | Hartman et al. |

OTHER PUBLICATIONS

Ball et al., "A Comprehensive Survey of Deep Learning in Remote Sensing: Theories, Tools and Challenges for the Community," Mississippi State University & University of Malaysia, Sep. 2017, 64 pages.

Bedord, "Sentera NDVI Crop Health Maps Show Field Contrast and Progression," Successful Farming, Jan. 2017, 7 pages.

Budde et al., "Agriculture and Food Availability-Remote Sensing of Agriculture for Food Security Monitoring in the Developing World," IEEE Oceanic Engineering Society, Feb. 2010, 10 pages.

Burwood-Taylor, "The Growing Ecosystem of Satellite Imagery for Ag," AFN, Mar. 2016, 10 pages.

Chao et al., "AggieAir: Towards Low-Cost Cooperative Multispectral Remote Sensing Using Small Unmanned Aircraft Systems," Advances in Geoscience and Remote Sensing, www.itechopen.com, Oct. 2009, 29 pages.

Chew, "Early Detection of Plant Disease Using Close Range Sensing System for Input into Digital Earth Environment," 8th International Symposium of the Digital Earth (ISDE8), 2014, 6 pages.

de Castro Victoria, "Cropland Area Estimates Using Modis NDVI Time Series in the State of Mato Grosso, Brazil," Pesq. Agropec. Bras., Brasilia, v47, n9, 2012, p. 1270-1278.

De Filippis et al., "A WebGIS Application for Precision Viticulture: From Research to Operative Practices," WebMGS 2010, ISPRS Conference, XXXVIII/4-W13, Jan. 2010, 7 pages.

Earth Observatory, "Measuring Vegetation (NDVI & EVI), NDVI as an Indicator of Drought," NASA, Aug. 2000, 3 pages.

Getahun Tadesse Kabthimer, "Assessment of Spatio-Temporal Patterns of NDVI in Response to Precipitation Using NOAA-AVHRR Rainfall Estimate and NDVI Data From 1996-2008, Ethiopia," 2012, 41 pages.

Hatfield et al., "Application of Spectral Remote Sensor for Agronomic Decisions," Agron J., vol. 100, No. Supplement 3, p. S-117, 2008, 16 pages.

Kassa, "Drought Risk Monitoring for the Sudan Using NDVI," University College London, Aug. 1999, 47 pages.

Khan et al., "Forest Change Detection in Incomplete Satellite Images with Deep Neural Networks," IEEE Transactions on Geoscience and Remote Sensing, vol. X, No. X, Aug. 2016, 17 pages.

Leilei et al., "The Relationship Analysis of Vegitation Cover, Rainfall and Land Surface Temperature Based on Remote Sensing in Tibet, China," IOP Conf. Series: Earth and Environmental Science 17, 2014, 7 pages.

McKellip et al., "Crop Surveillance Demonstration Using a Near-Daily MODIS Derived Vegetation Index Time Series," Computer Sciences Corporation, Mar. 2005, 5 pages.

Sun et al., "Daily Mapping of 30 m LAI and NDVI for Grape Yield Prediction in California Vineyards," Remote Sens., 2017, 18 pages.

Tiedje, Daily Satellite Imagery Creates Crop Monitoring Tool, Illinois Farmer Today, Oct. 2017, 5 pages.

Toksoz et al., "Automated Battery Swap and Recharge to Enable Persistent UAV Missions," American Institute of Aeronautics and Astronautics, 2011, 10 pages.

Wu et al., "Monitoring Cotton Root Rot by Synthetic Sentinel-2 NDVI Time Series Using Improved Spatial and Temporal Data Fusion," Scientific Reports, Jan. 2018, 12 pages.

Xiang et al., "Deep Learning in Remote Sensing: A Review," IEEE Geoscience and Remote Sensing Magazine, Oct. 2016, 60 pages.

Yamaha Motor Co., Ltd., "Yamaha Motor to Exhibit the New YMR-01 Industrial Drone at Next Generation Agriculture Expo Tokyo, New Coaxial Rotos Provide Excellent Agrochemicals Spraying Performance," Oct. 10, 2017, 2 pages.

Zhu et al., "Deep Learning in Remote Sensing: A Review," IEEE Geoscience and Remote Sensing Magazine, Oct. 2017, 60 pages.

Application and File history for U.S. Appl. No. 16/367,783, filed Mar. 28, 2019. Inventors: Jones et al.

Application and File history for U.S. Appl. No. 16/367,871, filed Mar. 28, 2019. Inventors: Hartman et al.

* cited by examiner

AUTOMATED OPTIMIZATION OF AGRICULTURAL TREATMENTS BASED ON RASTER IMAGE DATA SYSTEM

CROSS-REFERENCE TO RELATED APPLICATIONS

This application claims the benefit of U.S. Provisional Application No. 62/650,796 filed Mar. 30, 2018, and is related to U.S. Patent Application No. 62/650,810 filed on Mar. 30, 2018, each of which are hereby fully incorporated herein by reference.

TECHNICAL FIELD

Embodiments relate generally to optimizing agricultural treatments. More particularly, embodiments relate to systems and methods for the automated and optimized application of water and chemicals, for example, as agricultural treatments to an agricultural area using a raster image data system for handling both remotely-sensed aerial image data and land-based sensor data.

BACKGROUND

Recent advances in aerial remote sensing, machine learning, and controlled application of agricultural treatments allow for much finer estimation and control of moisture and overall health within an agricultural area than traditional methods. However, while the ability to detect myriad amounts of data in the industry has increased, problems remain in how to meaningfully store and analyze this data, as well as how to apply the analyzed data to effectively treat an agricultural area.

In one example, the academic paper "Application of Spectral Remote Sensing for Agronomic Decisions," authored by J. L. Hatfield, A. A. Gitelson, J. S. Schepers, and C. L. Walthall, discloses the current state of how leaf reflectance and leaf emittance have been used to quantitatively assess agronomic parameters and some of the challenges facing future generations of scientists seeking to further advance remote sensing for agronomic applications. (*Agron. J.*, vol. 100, no. Supplement_3, p. S-117, 2008.) However, the disclosure is silent as to any new or useful data structures for the remotely-sensed data or how to apply the analyzed data in a practical treatment application.

In another example, the academic paper, "A review of advanced machine learning methods for the detection of biotic stress in precision crop protection," authored by J. Behmann, A. K. Mahlein, T. Rumpf, C. Römer, and L. Plümer, discloses the basics of machine learning, analyzes its potential for precision crop protection and provides an overview of instructive examples from different fields of precision agriculture. (*Precis. Agric.*, vol. 16, no. 3, pp. 239-260, 2014.) However, the disclosure is likewise silent as to any new or useful data structures for the remotely-sensed data.

In another example, the academic paper, "A WebGIS Application for Precision Viticulture: From Research to Operative Practices," authored by T. De Filippis, L. Rocchi, E. Fiorillo and L. Genesio, discloses a solution to geospatial information and geodata accessibility for vineyard management. (WebMGS 2010, ISPRS Conference, XXXVIII/4-W13.) In particular, disclosed are a geoportal to organize geospatial data and services through a viewer, a catalogue containing metadata records, and a geodatabase. However, the disclosure describes generic database storage for the geospatial data.

In another example, the academic paper, "Multispectral remote sensing for site-specific nitrogen fertilizer management," authored by N. Bagheri, H. Ahmadi, S. K. Alavipanah, and M. Omid, Mahmoud, discloses an experiment to evaluate the use of multispectral remote sensing for site-specific nitrogen fertilizer management with satellite imagery. (*Pesquisa Agropecuária Brasileira*, vol. 48, no. 10, pp. 1394-1401, 2013.) Again, this disclosure is silent as to any new or useful data structures for the remotely-sensed data or how to apply the analyzed data in a practical treatment application.

In another example, U.S. Pat. No. 8,712,148, entitled "Generating agricultural information products using remote sensing," describes generating a raster file based on a plurality of primary index raster files that are associated with an area of interest (AOI) using a computer coupled to a remote sensing device. However, the disclosure does not describe specialized storage of raster index files, and inefficiently describes generation of an index raster file.

Various systems have been described in patents and patent applications relating to digital models and mapping of agricultural data and treatments, such as those described in U.S. Pat. No. 9,519,861; and U.S. Appl. Publ. Nos. 2017/0223889 and 2017/0131254. These systems are generally particular to a specific nutrient or crop mapping or performance and do not present new or useful data structures for remotely-sensed data.

There is a need for systems and methods that can more efficiently store and integrate remotely sensed data, as well as analyze the integrated data in order to precisely treat an agricultural area.

SUMMARY

Embodiments of systems and methods are configured to collect, combine, store, and process remote sensing and imaging information for agricultural areas of vegetation as a raster image data system for handling both remotely-sensed aerial image data and land-based sensor data, as well as previous agricultural treatments, in order to optimize future agricultural treatments to variable resolutions of the area of vegetation corresponding to that represented by a pixel in a raster image data system of the area.

More particularly, the availability and use of unmanned aerial vehicles (UAVs) as remote sensing and environmental data collection platforms has been accelerated by advances in image processing, machine learning, and computer systems for the extraction and application of information acquired by these vehicles. Additionally, there have been improvements in hardware and software used for precise application of chemical treatments and water to desired areas. Thus there is an opportunity to determine the current and anticipated needs of a particular area to minimize stress and, by controlled application of water and other treatments, maximize the productivity of a given agricultural area such as a field of crops, orchards, or golf turf.

In an embodiment, a system for optimizing the application of a treatment material to an agricultural area comprising a learning engine comprising instructions that, when implemented by a processor operably coupled to memory, cause the processor to receive a plurality of training raster images having a plurality of pixels, the plurality of training raster images including a set of parameters corresponding to the intersection points of each training raster image at each relative pixel location, learn the relationship between the set of parameters and at least one biological stress, and output a probability of the at least one biological stress for every pixel in the training raster images as a trained learning engine output; a first remote data capture device configured to capture data related to the agricultural area in a first raster image; a second remote data capture device configured to capture data related to the agricultural area in a second raster image; a data cube storage configured to store the first raster image and the second raster image in an agricultural raster data cube, the agricultural raster data cube comprising a set of detected parameters corresponding to the intersection points of the first raster image and the second raster image at each relative pixel location; and an application engine comprising instructions that, when implemented by a processor operably coupled to memory, cause the processor to receive the trained learning engine output, determine the probability of disease based on the set of detected parameters in the agricultural raster data cube, and output a proposed treatment raster specifying an amount of treatment material for each pixel location in a precision applicator format.

In an embodiment, a method for optimizing the application of a treatment material to an agricultural area comprises training a machine learning network with a plurality of training raster images having a plurality of pixels; training the machine learning network with a plurality of known diseases; capturing a plurality of raster images using one or more image capture devices; storing the plurality of raster images as an agricultural raster data cube in a data cube storage, the agricultural raster data cube comprising a set of detected parameters corresponding to the intersection points of the plurality of raster images at each relative pixel location; determining a probability of disease for each pixel location in the agricultural raster data cube based on the set of detected parameters, and outputting a proposed treatment raster specifying an amount of treatment material for each pixel in a precision applicator format.

In a feature and advantage of embodiments, systems and methods described herein extend the ability of image analysis of current solutions. For example, the systems and methods of the instant invention extend image analysis in at least three ways.

First, systems utilize machine learning and heuristics to capture and analyze man-made and environmental inputs that lead to agricultural stress. Embodiments of a trained machine learning network can learn various combinations of input sets of spectral bandwidths and the resulting stresses in order to effectively predict and retrain the network.

Second, the remote sensor analysis is applied on a pixel-by-pixel basis that can speed up compute time. For example, a pixel-oriented processing unit can read in a subset of rasters in order to process images section-by-section instead of serially. In embodiments, a plurality of processing units can operate in parallel to process images or portions of images in parallel. For example, a graphics processing unit (GPU) can operate on the raster images. In another embodiment, an Artificial Neural Network (ANN) and a collection of Field Programmable Gate Arrays (FPGA) can operate on the raster images. Further, operation on a pixel-by-pixel basis allows for the estimation of agricultural stress on a precise per-pixel basis applied to the land area. This allows for a further reduction in processing time by limiting the calculations to regions of interest rather than entire raster planes.

Third, raster storage and processing in an agricultural raster data cube (ARDC) allows for the efficient storage of the growing amounts of data that can be collected. Further, analysis of an ARDC allows for the efficient extraction of data over time or by area. Layers can be tailored to the particular agricultural application, including different layers of inputs, stresses, and outputs. This in turn allows for custom machine learning models tailored to the aforementioned agricultural application.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
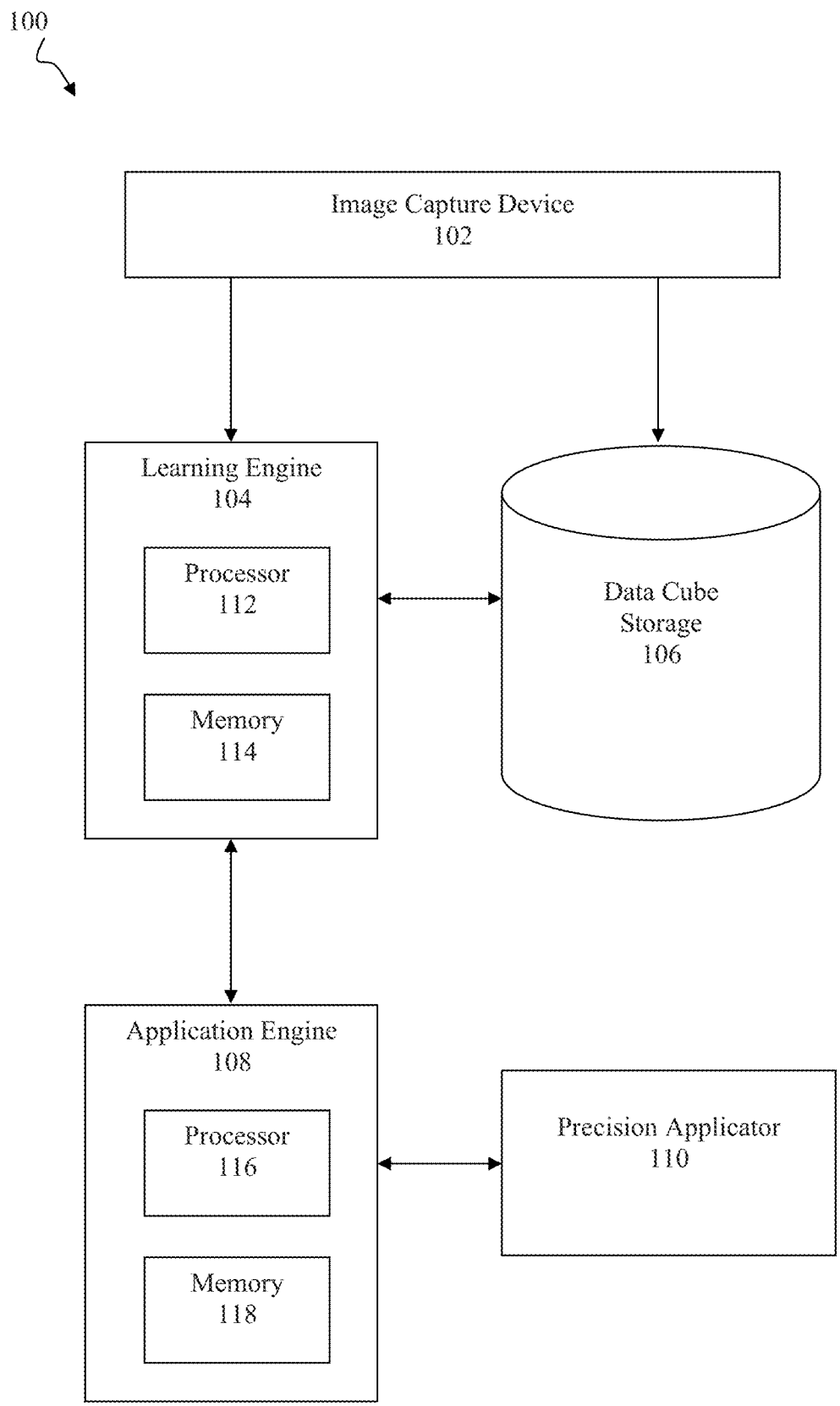
FIG. 1 is a block diagram of a system for optimizing the application of water and chemicals to an agricultural area using raster images of remotely-sensed data, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for optimizing the application of water and chemicals to an agricultural area using raster images of remotely-sensed data is depicted, according to an embodiment. System 100 generally comprises an image capture device 102, a learning engine 104, a data cube storage 106, an application engine 108, and a precision applicator 110.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of system 100, and the corresponding methods of configuring and operating the system 100, can be performed in cloud computing, client-server, or other networked environments, or any combination thereof. The components of the system can be located in a singular "cloud" or network, or spread among many clouds or networks. End-user knowledge of the physical location and configuration of components of the system is not required. For example, as will be described, learning engine 104, data cube storage 106, and application engine 108 can be combined as appropriate to share hardware resources, if desired.

Image capture device 102 generally comprises an apparatus for remotely sensing data related to an area of land. In an embodiment, image capture device 102 can comprise a UAV having one or more sensors for capturing data proximate the flight path of the UAV. For example, the UAV can include an integrated imaging camera, thermal sensor, infrared camera, or temperature sensor. In an embodiment, the UAV can comprise two or more of the aforementioned remote sensors. In embodiments, system 100 can further comprise a plurality of ground-based sensors such as air temperature sensors, humidity sensors, rain gauge sensors, and the like, in addition to the aerial-based UAV-mounted sensors. In contrast to the satellite imaging solutions described above, imaging primarily by a UAV (with ground or other localized sensors as needed) allows treatment precision on the order of centimeters. In addition to the typically higher image resolution associated with UAV-based sensors, UAV platforms described herein typically provide higher revisit rates than satellite platforms.

In embodiments, image capture device 102 can capture data that is georeferenced such that an internal coordinate system of a map or aerial photo image is related to a ground system of geographic coordinates. The relevant coordinate transforms can be stored within the image file captured.

In an embodiment, a controller for image capture device 102 can be integrated with the controller for the UAV such that images are automatically captured along a flight path. In other embodiments, the capturing of images can be remotely commanded by a user during the flight. Image capture device 102 is configured to temporarily store the captured data and transmit the data to learning engine 104 and/or data cube storage 106.

Learning engine 104 is configured to learn the relationship between combinations of parameters from each type of information represented by a raster layer and a particular type of stress. As illustrated in FIG. 1, learning engine 104 generally includes a processor 112, a memory 114, and instructions executable on the processor to receive raster layers, analyze the raster layers, and provide an output.

Processor 112 can be any programmable device that accepts digital data as input, is configured to process the input according to instructions or algorithms, and provides results as outputs. In an embodiment, processor 112 can be a central processing unit (CPU) configured to carry out the instructions of a computer program. Processor 112 is therefore configured to perform at least basic arithmetical, logical, and input/output operations.

Memory 114 can comprise volatile or non-volatile memory as required by the coupled processor 112 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In certain embodiments, learning engine 104 can comprise a distributed machine learning network and need not comprise a single processor 112 or memory 114. However, those components are simply described herein for ease of explanation.

In operation, learning engine 104 is configured to receive a plurality of training raster images having a plurality of pixels, the plurality of training raster images including a set of parameters corresponding to the intersection point of each training raster image at each pixel location, learn the relationship between the set of parameters and at least one biological stress, and output a probability of the at least one biological stress for every pixel in the training raster images as a trained learning engine output.

Data cube storage 106 generally comprises specialized data storage for storing sets of georeferenced raster images. In embodiments, each georeferenced raster image has a resolution smaller than is required for precision application treatment.

In an embodiment, a plurality of raster images are stored as a data cube. For example, in an embodiment, data cubes are stored efficiently using a series of pointers to each raster image layer. In such an embodiment, data cube storage 106 might only have one instance of each image layer.

In another embodiment, data cube storage comprises multiple instances of the same raster image layer. For example, one instance of a raster image that is part of a particular data cube is stored proximate the other instances of the raster images making up that particular data cube to save time on lookup calls. That raster image that might form part of a second data cube can be saved as a second instance in data cube storage 106. System 100 can therefore account for efficiency tradeoffs between searching and storage.

Figure 7:
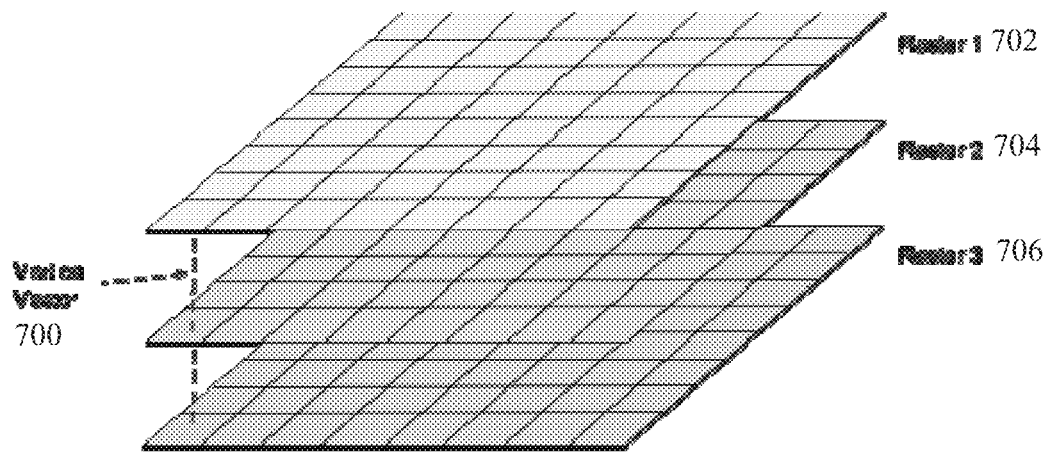
FIG. 7 is an exploded view of a raster vertical vector, according to an embodiment.

In an embodiment, data stored within the data cubes is stored using a lossless method, such as with TIF or HDFS for lossless storage of multiple image layers. For example, an ARDC serves as a repository of the raw data from the various sources, i.e. sensors, imagers, and data files. The data stored within the multiple layers can be read, processed, and held in an intermediate format (a data array) that can be manipulated and passed to a collection of parallel artificial neural net (ANN) processors. Each ANN processor is an 'M' input and 'N' output processor that processes the collection of data elements lying along a "vertical" that passes through the raster cell in each layer within the ARDC (see discussion of FIG. 7 below). For speed or storage limitations, any type of image storage format can be utilized, so that data stored within the data cubes is downsampled or lossy.

In another embodiment, data cube storage 106 is compressed by storing only change data from one time period to the next, thus reducing the amount of storage required. In other words, only the delta values for the various parameters can be stored in a raster image.

In an embodiment, data cube storage 106 can further comprise treatment rasters; for example, a grayscale image generated for a precision applicator. In an embodiment, each layer in a treatment cube can comprise a different treatment. If the entire grayscale image at that treatment's respective layer in the output data cube contains only zeros, then no amount of that particular treatment is applied to the geographic area encompassed or defined by the raster. In an embodiment, input spatial resolution (pixel/meter) can be mirrored in the output resolution. A third dimension can be treatment options such that the resolution in that dimension is determined by the number of treatments that are able to be estimated.

In one embodiment, image capture device 102 interfaces directly to data cube storage 106 to transfer the raster images captured to more permanent storage. In another embodiment, image capture device 102 interfaces to learning engine 104, which commands the captured raster image data to be stored in data cube storage 106. If required, learning engine 104 can further combine multiple raster images into a data cube for storage in data cube storage 106.

Data cube storage 106 is therefore configured to store the images and corresponding data cubes captured by image capture device 102 as well as known data sets containing combination of intensities for each parameter represented by a layer and the associated stresses that are represented by these combinations of intensity ranges for each parameter. Accordingly, data cube storage 106 can access public sets of data outside of system 100 illustrated in FIG. 1 for training purposes.

Application engine 108 is configured to process the output of learning engine 104 into an applicator-specific output. In an embodiment, application engine 108 generally includes a processor 116, a memory 118, and instructions executable on the processor to receive the learning engine output, process the learning engine output, and generate an applicator-specific set of commands to apply one or more liquids to the area of land. In embodiments, processor 116 and memory 118 can be respectively substantially similar to processor 112 and memory 114 described above. In another embodiment, learning engine 104 and application engine 108 can share a processor and memory, for example, processor 112 and memory 114, such that the engines 104 and 108 do not need their own separate instances of a processor and memory.

For example, an output of learning engine 104 can comprise a raster image or other set of data that indicates the probability that that a given pixel is diseased. In one embodiment, an outputted raster image from learning engine 104 can comprise a grayscale raster image indicative of the probabilities of disease. Application engine 108 can receive that outputted raster image, search a lookup table for how to treat each level of stress intensity, or, where appropriate, a vector of stress, and output an applicator-specific grayscale image configured to drive an applicator to place water or other chemicals for the georeferenced pixels in the applicator-specific grayscale image.

In an embodiment, resolution in terms of treatment application amounts is determined by the actual treatment. For example, Treatment A could be applied in 1 mL increments per square meter, while Treatment B might have a resolution of 5 mL. Treatment A can then have calculated application amounts of $\{1, 2, 3, 4, 5, 6, 7, \ldots\}$ mL per sq meter, where treatment B would have $\{5, 10, 15, 20 \ldots\}$ mL per sq meter.

Precision applicator 110 comprises a treatment device as required by the applicator-specific output. For example, precision application 110 can comprise a sprayer for producing a flow of spray material and sprayer output. In embodiments, the applicator-specific output can comprise angle, elevation, and pressure commands for the applicator head to precisely apply a treatment. In other embodiments, the applicator-specific output can comprise other applicator control commands, such as pressure over time such that given the area of the output plenum, flow rate can be calculated.

In one example, circular sprayers can have a pattern down to 3", or on the order of a pixel. Larger "fan"-type (narrow elliptical) patterns can be up to 16"-20" inches along the long axis and up to a few inches along the short axis. The resolution is therefore the order of the finest treatment option, for the case of the "ground sample distance" (GSD) represented by a pixel is a few inches. In embodiments, systems can apply down to a few pixels of resolution, i.e. less than ten inches, based on the 16" to 20" fan pattern introduced previously.

In another example, boom arm sprayers are configured to spray around 24"-36" off the ground. A spray rig can spray lower than boom arm sprayers. In various embodiments, each spray is nozzle-dependent and will have variability, which can be accounted for in a treatment raster.

In an example, if a treatment raster is too "high up" treatments lose the precision needed with the precision imaging described herein. Images therefore accommodate applicators with relatively small applicator precision (specific applications), as well as larger applicators to do swaths at a time. It is not desirable to have to treat a precise pattern (e.g. 10 cm×10 cm) if an entire large area needs the same treatment (e.g. ¼ of an acre). Embodiments are thus tailored to scale up or scale down. In an embodiment, Scale-Invariant Feature Transform (SIFT) can be utilized.

Precise treatment or wide treatment is driven by a number of factors. For example, in general it is cheaper to use wide spraying compared to precise spraying. So, considerations are made as to the cost of treatment and rate of spread of the disease, which also can be included as data in a raster image.

In related considerations, factors for how quickly to spray an affected site, against the cost of the treatment, and the desired size of the treatment area can likewise be utilized. Applicator control speed similarly factors in. Control can be considered in terms of how fast the sprayers can be turned on and off, and how fast the pattern of the spray head can be adjusted. Embodiments can turn a valve on or off in 1 millisecond. At speeds up to 25 Km/h, this is less than 1 millimeter (0.7 mm) across the ground from the time that valve starts to open to the time that the valve is fully open.

In embodiments, precision applicator 110 can be positioned on an aerial-based UAV similar to the UAV integrated with image capture device 102. In embodiments, the image capture and application UAVs can comprise the same UAV. In other embodiments, precision applicator 110 can be ground-based, such as a wheeled spot sprayer, field sprayer, or precision boom positioned on the ground proximate the land area to be treated.

In operation, UAV-based image capture device 102 captures data as a raster image. Each cell or 'pixel' within the image represents the intensity recorded by the sensor that is associated with that rectangular sub-area of the larger agricultural area being imaged. The value stored within the pixel, the intensity, typically ranges from 0-255 (for an 8-bit imaging system, but other ranges are commonly used as well for higher levels of precision at the cost of increased memory usage). This range is referred to as the 'dynamic range' and represents all of the unique possible values that can be contained in the raster image. In the dynamic range, 0 typically represents a minimum amount of energy detected and 255 represents a maximum amount of energy detected. In a grayscale image, values of 0 would appear as black, and 255 would appear as white.

Figure 2:
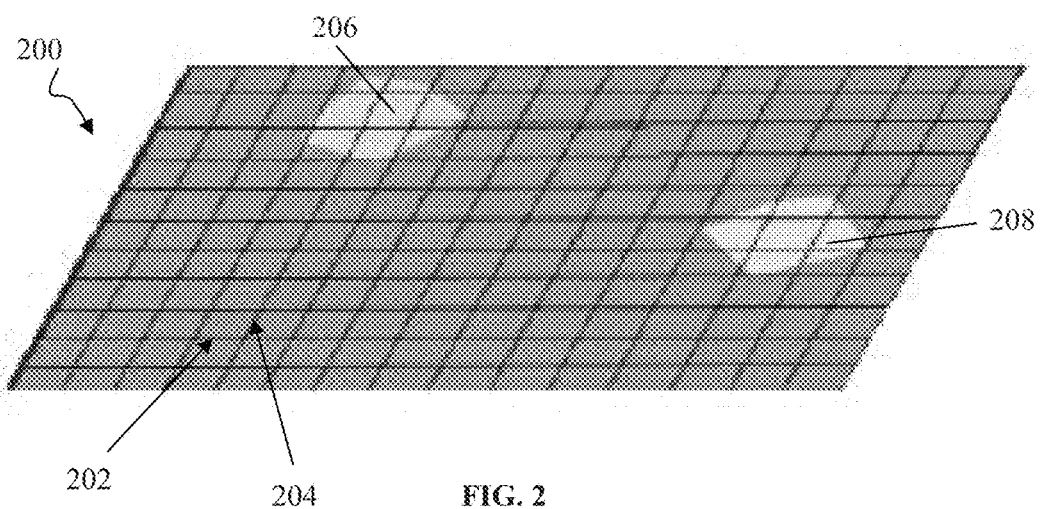
FIG. 2 is a perspective view of a raster image of an example agricultural area, according to an embodiment.

Referring to FIG. 2, a perspective view of a raster image 200 of an example agricultural area is depicted, according to an embodiment. Raster image 200 is a hypothetical image depicting aerial sensor image data acquired by, for example, UAV-based image capture device 102. FIG. 2 illustrates an area of vegetation showing aerial color variation.

Raster image 200 generally comprises a bitmap or grid of individual pixels that collectively compose an image. For example, a plurality of horizontal gridlines 202 intersect a plurality of vertical gridlines 204 to create a plurality of pixels. Of course, gridlines 202 and 204 need not run perfectly parallel or vertical and can be configured for the particular imaging device being used.

In embodiments, raster images are the direct output of an imaging device, with the horizontal gridlines 202 and vertical gridlines 204 creating various rows and columns. This simplified approach over vector images saves processing time because there is no need for attribute assignment and generation.

Shown within image 200 are areas of interest 206 and 208 that consist of pixels and portions of pixels. The areas of interest 206 and 208 generally have a different intensity than the "background" intensity of the remaining pixels. Areas of interest 206 and 208 can comprise stressed areas to be treated, for example.

In embodiments, pixels correspond to certain areas of land. For example, if UAV-based image capture device 102 flies at 100 meters, each pixel can represent a 4 cm by 4 cm area of land. In another example, if image capture device 102 flies at 1000 meters, each pixel can represent a 1 meter by 1 meter area of land. One skilled in the art will readily appreciate that these values are given by way of example only and image capture device 102 can be configured for various image capture heights and image resolutions.

Image 200 can be georeferenced. For example, during the image capture of image 200, a global positioning system (GPS) can tag the image in relation to the ground over which the image is taken. In another embodiment, the image can utilize ground control points for ground location reference. For example, a ground control point can be a geographic or man-made landmark with an exact known location. Thus, the raster images used herein can reference a particular location in space and a unique position on the earth.

The agricultural areas captured by, for example, image 200 such as fields of crops, orchards, and golf turf can be considered their own systems. Inputs to the system are anthropogenic and non-anthropogenic. Anthropogenic inputs include water, chemical applications, and other treatments. Non-anthropogenic inputs include rain, ambient weather, pests, and disease.

Anthropogenic inputs are adjusted to maintain the health and production of that area. The agricultural area system outputs are the amount and type of vegetative activity. This can be evaluated or monitored in a number of ways including remote sensing using airborne imaging and ground-based sensors placed proximate the area of interest.

Anthropogenic inputs to the system can be monitored using sensors placed on water/irrigation distribution systems or sensors placed on the applicators associated with chemical or biological treatments. Non-anthropogenic inputs can be monitored directly and indirectly. This includes in-field meteorological sensors and estimation of the effect of pests and disease. Estimation of pests and disease is accomplished through analysis of the remote and in-situ sensors and monitors.

In embodiments, meteorological conditions, disease triangle considerations (components of environment, the host and an infectious agent), use on the land (golf course patrons walking compared to golf cart riding), and shadow vs. sun can all be input as raster images into an ARDC as temporal aspect rasters.

Techniques for populating pixels in a raster image to represent inputs obtained from non-aerial mapping sensors are disclosed herein. For example, if there are a dozen rain gauge sensors on a given golf course, extrapolating the "amount of rain received" onto each pixel in the data block presents a problem solved herein. For example, if an agricultural area has a number of distributed sensors, a "Trend Surface Analysis" can estimate values across a region with only samples from locations across the region. The resultant surface trend is represented by an equation that can be used to calculate the value at any location (or raster) within the area of interest. In another embodiment, a grid or mesh of moisture levels or other sensor values can be interpolated using a parametric equation that best models the spatial distribution of that measurement. For sensors measuring some 'pan-area' effect, all the rasters in the layer representing the effect would have the same value.

Raster image values can differ between anthropogenic and non-anthropogenic inputs. For example, something like moisture level might be a function of several variables (like shaded regions evaporating slower than sunny regions, and lower areas evaporating slower than high areas). Pests or diseases may or may not be more localized, as well, and can reflect differing values in a corresponding raster image.

Figure 3:
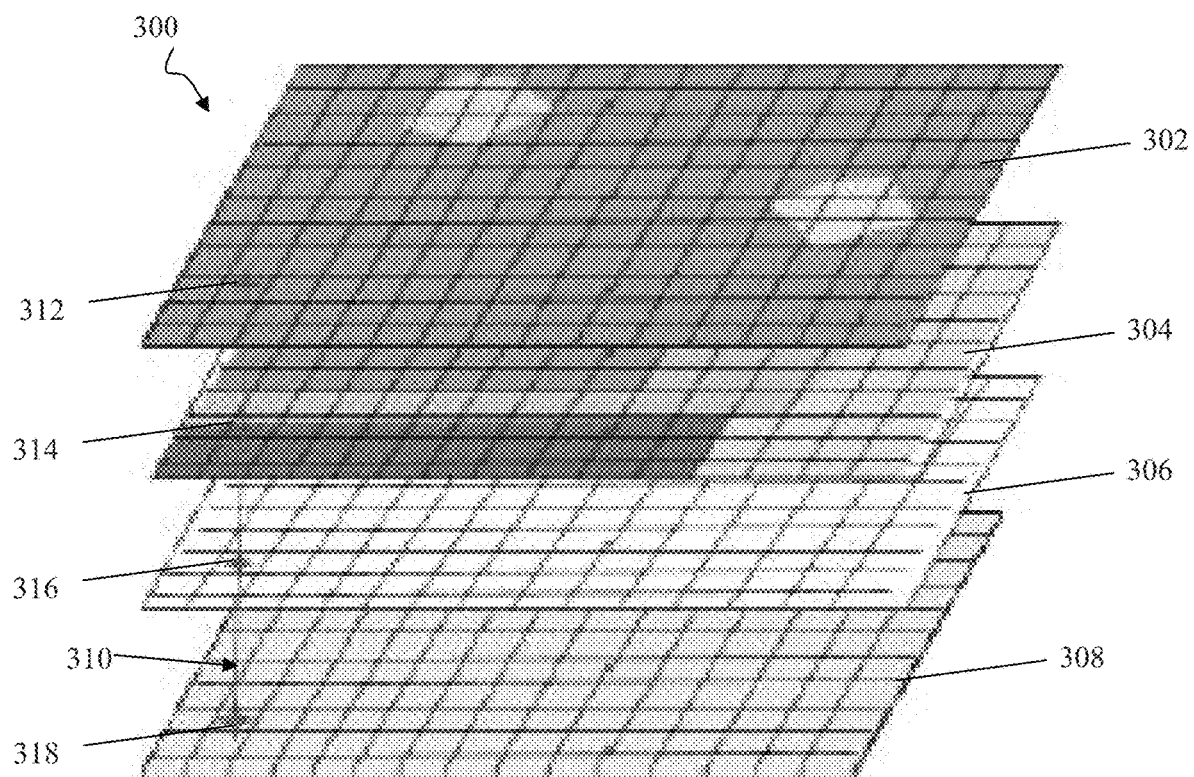
FIG. 3 is an exploded perspective view of an agricultural raster data cube, according to an embodiment.

Referring to FIG. 3, an exploded perspective view of an agricultural raster data cube 300 is depicted, according to an embodiment. ARDC 300 generally comprises layers 302-308, each of which represent a raster image having data captured by, for example, various implementations of image capture devices 102.

Raster layers 302-308 are illustrated to show the breadth of the data that is held within an ARDC. Information contained in a layer can include, for example, true color photos of the area in red, green, blue (RGB), near-infrared intensity photos, thermal imagery, location and amount of a specific soil or vegetative treatment, location and amount of irrigation or water applied, latitude of pixels, time of year, air temperature, humidity, previous chemical treatment, or previous irrigation amount.

The raster layers 302-308 of ARDC 300 are positioned parallel to each other. Accordingly, intersecting line 310 is orthogonal to each of raster layers 302-308 and intersects each layer plane at a particular intersection point pixel. For example, intersecting line 310 intersects raster layer 302 at intersection point 312. Intersecting line 310 intersects raster layer 304 at intersection point 314. Intersecting line 310 intersects raster layer 306 at intersection point 316. Intersecting line 310 intersects raster layer 308 at intersection point 318. Thus, each raster shows the spatial correlation of various levels of intensity or measurements associated with that particular data type at the time represented by the ARDC. Taken together, the combinations of data represented along intersecting line 310 at intersection points 312-318 can be used as inputs to train a machine learning network, as well as determine stresses in the agricultural area. As will be described, certain pixels corresponding to certain precise sub-areas can be analyzed and treated. Further, larger areas reflected by the entire agricultural area can be analyzed and treated (e.g. healthy areas proximate unhealthy areas or proximate soon-to-be unhealthy areas).

As illustrated above, each ARDC can reflect a particular time or time frame for the data captured in each of the raster layers 302-308. For example, all layers might correspond to data captured within the same hour, or on the same day, or the same week, and so on. In other embodiments, some of the raster layers can represent a certain time period, and other raster layers can be forward-looking or backward-looking relative to that time period, depending on the application.

One skilled in the art will appreciate that additional or fewer layers than raster layers 302-308 can be utilized. With respect to additional layers, the system is only limited by data storage limitations or timing requirements for data access. In one embodiment, a preferred number of layers can vary based on the types of stress being estimated. For example, a minimum of two layers, red light and near-infrared light, can be used to calculate the Normalized Difference Vegetation Index (NDVI). In an embodiment, over forty possible layers can be used.

Raster images organized in an agricultural raster data cube can optimize dimensionality considerations in agricultural treatment. For example, not all areas in which treatment is desired will have the same priority. Consider a golf course in which the greens will be treated far differently than the rough, which will be treated differently than the fairways. Using raster cubes at various levels of magnitude for the various different treatment areas allows for optimized treatment. In the golf course example, the greens might utilize a raster cube with raster images at 2 $cm^2$ and the rough might utilize a raster cube with raster images at 8 $cm^2$. In other words, the disclosed optimization of selectively scaling the data cube based on the value of the land area being imaged and treated differentiates traditional farming applications.

Figure 4:
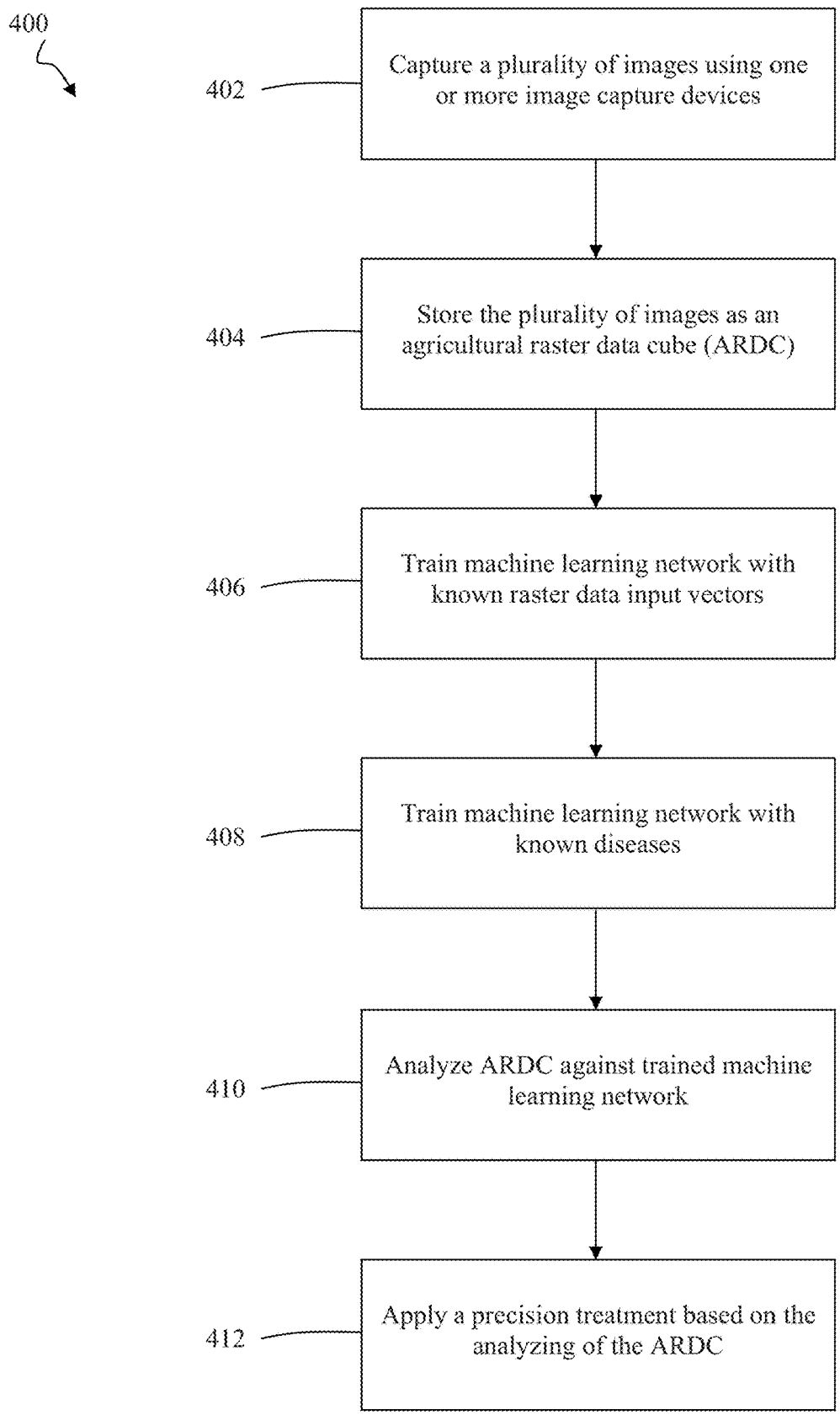
FIG. 4 is a flowchart of a method for optimizing the application of water and chemicals to an agricultural area using raster images of remotely-sensed data, according to an embodiment.

Referring to FIG. 4, a flowchart of a method 400 for optimizing the application of water and chemicals to an agricultural area using raster images of remotely-sensed data is depicted, according to an embodiment. Method 400 can be implemented by system 100, for example.

Method 400 generally comprises capturing a plurality of images using one or more image capture devices at 402. For example, image capture device 102 can capture a raster image over a particular agricultural area. A second image capture device can capture another raster image incorporating different data for the same agricultural area.

Method 400 further comprises storing the plurality of images as an agricultural raster data cube at 404. For example, each image capture device 102 can transmit the captured raster image directly to data cube storage 106 or via learning engine 104 in certain embodiments. Based on the type of agricultural application, the various raster images are organized into one or more agricultural raster data cubes and stored in data cube storage 106.

Method 400 further comprises training a machine learning network with known raster data input vectors at 406. For example, learning engine 104 can receive sets of data corresponding to per-pixel values of known raster image sets. These sets of data can comprise values such as intensity, hue, saturation value, RGB. These sets are provided by way of example only and are not intended to be limiting in any way. Other raster data images can comprise values for texture (such as the value of curl of a leaf such that each pixel represents a certain texture or estimation of texture), environmental (such as values for identified objects like trees, rocks, or water), or topology (values for geometric properties and spatial relations). In other embodiments, soil moisture levels across an area can be a single value held by each cell in the raster. In another embodiment, in color, whether HSV or RGB can be held respectively as three layers that each hold a single value in each cell.

Method 400 further comprises training the machine learning network with known diseases at 408. For example, learning engine 104 can receive sets of known diseases corresponding to the known raster image input sets to learn the combinations of pixel input combinations and indications of various vegetative stresses. Further details of the particular machine learning are described in FIG. 5 and its associated text. One skilled in the art will appreciate that data capture and storage at 402 and 404 can be conducted after the training of the machine learning network at 406 and 408, instead of before the training as shown in FIG. 4.

Method 400 further comprises analyzing the ARDC against the trained machine learning network at 410. On a per-pixel basis, along the intersecting lines at their various intersecting points to the various input raster planes, sets of data are analyzed against the known combinations learned from the machine learning training in 406 and 408. In an embodiment, the output of the analysis can comprise an application treatment raster reflecting the water, chemicals, or other treatment for the agricultural area.

Method 400 further comprises applying a precision treatment based on the analyzing of the ARDC at 412. For example, application engine 108 can command precision applicator 110 based on the application treatment raster.

Figure 5:
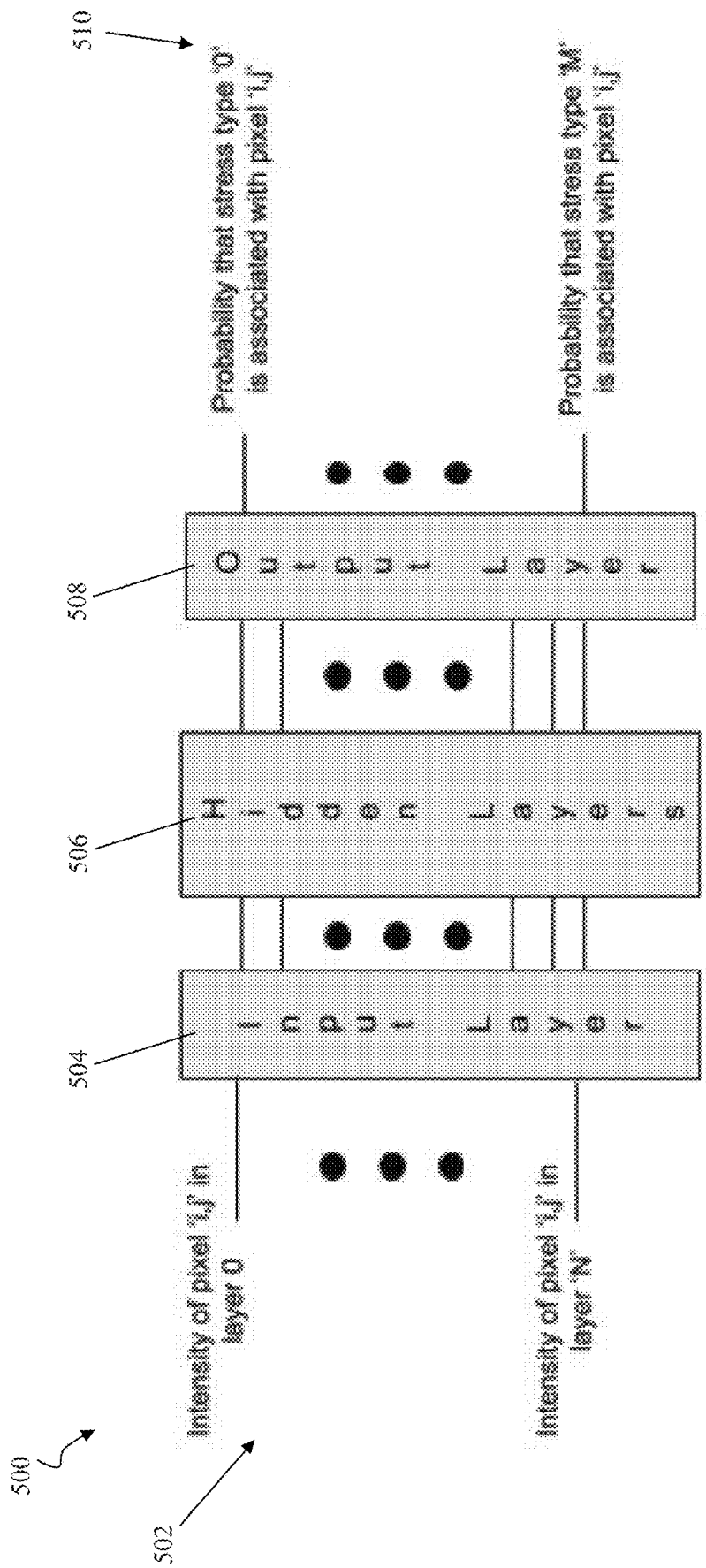
FIG. 5 is a block diagram of a machine learning subsystem using an agricultural raster data cube, according to an embodiment.

Referring to FIG. 5, a block diagram of a machine learning subsystem 500 using an agricultural raster data cube is depicted, according to an embodiment. In particular, FIG. 5 depicts a machine learning instance for associating inputs with a probability of a given biological stress. The steps of machine learning in the machine learning subsystem of FIG. 5 can be implemented by learning engine 104, for example.

As briefly described above, machine learning is used to learn the relationship between combinations of parameters from each type of information represented by each raster layer and a particular type of stress. Based on the intensity of a pixel in a given layer, the probability of a particular type of stress (disease-based or environmental-based) will be determined based on the combination of intensities for the same pixel location in given layers. This probability can be determined by training a machine learning network from sets that contain combination of intensities for each parameter represented by a layer with a known, associated stress that is represented by these combinations of intensity ranges for each parameter.

This approach is combined with image processing techniques to predict the spread of a disease or stress based on the changes across a given set of layers in two or more ARDCs. Based on treatments for particular types of environmental stresses or plant diseases, either prescriptive treatments (based on current estimated stress) or preventative treatments (based on predictive spread of the area of stress) can be generated to address the resulting estimated plant stresses. These treatments are stored in the form of rasters. Each raster represents a pixelated-view of the amount of each treatment that will be applied at a particular location. Since the resolution of the agricultural area extends to the pixel level, estimation of proposed treatments can likewise be done at the pixel level.

In an embodiment, a proposed treatment raster (PTR) reflects the proposed treatment for the agricultural area. As described above, a PTR can be used to control an automated precision applicator to dispense the required treatment or water. In embodiment, the actual record of treatment applied is captured and stored as an actual treatment raster (ATR). ATRs can be used as input layers in future ARDCs. Thus, embodiments of system 100 can be self-learning and incorporate hysteresis considerations to update the trained network. Thus, embodiments account for the dependence of the state of agricultural areas based on its history of past actual treatments.

In another embodiment, training data can also be added to an existing network, rather than retraining a network in its entirety. Therefore, given some prediction, a user can assign an error value and the network can be improved with just a single training iteration. In another embodiment, ground truth data can be used to calculate the error, which can be input to add to an existing network.

For example, in FIG. 5, machine learning subsystem 500 can use the intensity of pixel (i, j) in layer 0 to layer N as inputs within input layer 504. A plurality of hidden layers 506 likewise provide combinations of intensities for the same pixel location pixel (i, j) in layer 0 to layer N.

In an embodiment, hidden layers are simply "hidden" from the input and output (i.e. they don't interact directly but are downstream/upstream in the processing pipeline). Hidden layers can comprise feature extractors/filtering layers that emphasize the features desirable in probability calculations even further downstream. In embodiments, the hidden layers can comprise stress 0 to stress M. Output layer 508 comprises the probability 510 that stresses type 0 to type M are associated with pixel (i, j). Machine learning subsystem 500 is illustrated for a single pixel combination (i, j) but can be conducted for all pixels.

Figure 6:
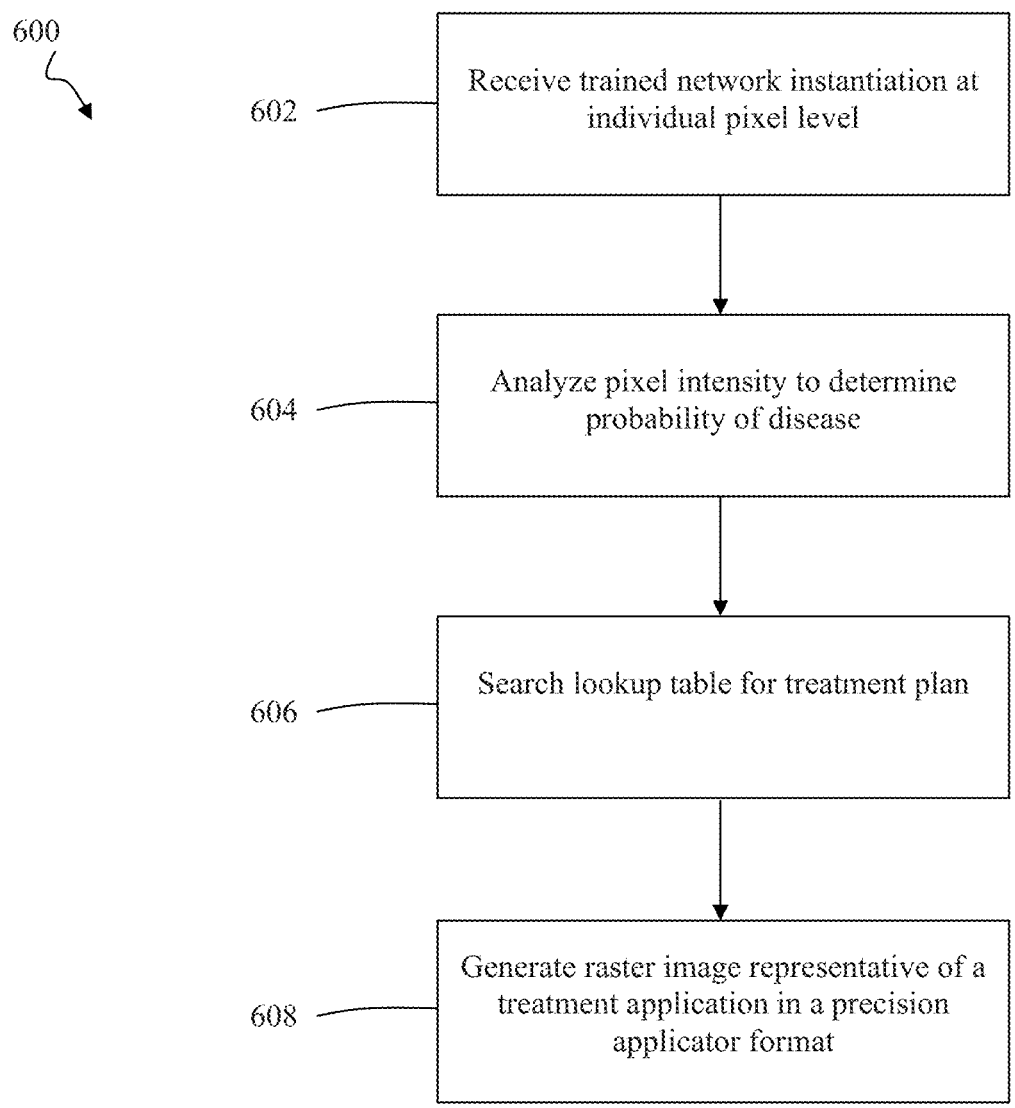
FIG. 6 is a flowchart of a method for analyzing an agricultural raster data cube with a trained machine learning subsystem, according to an embodiment.

Referring to FIG. 6, a flowchart of a method 600 for analyzing an agricultural raster data cube with a trained machine learning subsystem is depicted, according to an embodiment. Method 600 can be implemented by application engine 108, for example.

Method 600 generally comprises receiving a trained network instantiation at 602. In embodiments, the trained network instantiation can be generated by learning engine 104 as described above. In embodiments, the trained network is configured to analyze at the pixel level.

Method 600 further comprises analyzing pixel intensity to determine the probability of disease at 604. For example, a raster cube captured from data from one or more image capture devices 102 and stored in data cube storage 106 can be run through the trained network instantiation. A probability of disease based on the outputted probabilities from the machine learning subsystem 500 (for example, for stresses 0 to M) for each pixel for the various actual layers captured can be calculated. In an embodiment, an output is a raster image with intensities reflecting the probability of disease for a given stress or disease. For example, a higher intensity would reflect a higher probability of disease. A lower intensity would reflect a lower probability of disease.

Method 600 further comprises searching a lookup table for a treatment plan at 606. In an embodiment, the lookup table can comprise stress or disease probabilities and corresponding treatment plans. The lookup table can comprise data at the per-pixel level, such as a lookup by pixel intensity. For example, for pixel (i, j) given its intensity for a disease A, lookup table could correspond to a one-time treatment of a chemical A corresponding to the precise agricultural area for that pixel to treat disease A. In other embodiments, groups of pixels can be considered together and treated together. For example, a grouping of pixels can be a 3×3 pixel area.

Method 600 further comprises generating a raster image representative of a treatment application in a precision applicator format at 608. For example, certain pixels proximate each other might need different treatments. Pixel (i, j) might need an application of chemical A, but the surrounding pixels might need water treatment. A raster image representative of the entire agricultural area at issue can thus be generated as a proposed treatment raster.

In an embodiment at 608, a grayscale image can be generated if the precision applicator format also accepts data cubes. For example, each layer can comprise a different treatment. If the entire grayscale image at that treatment's respective layer in the output data cube contains only zeros, then no amount of that particular treatment is applied to the geographic area encompassed or defined by the raster.

The proposed treatment raster can drive a precision applicator such as precision applicator 110. Precision applicator 110 can then precisely apply the treatments to the agricultural area.

In an embodiment, an actual treatment raster can be input to data cube storage 106 (although not depicted in FIG. 1 for ease of illustration). For example, precision applicator 110 can generate an actual treatment raster and subsequently interface with learning engine 104 or data cube storage 106 to the actual treatment raster on how the agricultural area was actually treated as another raster layer to the data cube or multiple data cubes, where applicable. In another embodiment, application engine 108 can generate the actual treatment raster.

In embodiments, the aforementioned ARDC can reflect a particular time or time frame for the data captured in each of the raster layers by adding a time dimension to the existing three-dimensional cube and can thus be represented as an N-dimensional hypercube.

ARDCs can further be used to project future problem pixel areas in sets of light and dark pixels as a stress vector. Put another way, the aforementioned ARDCs can correspond to actual past data to existing treatment, but in certain embodiments, separate sets of projected future pixels (e.g. one day in the future or one week in the future) for actual past data to future predictions can also be generated. Thus, estimates of projections at certain times in the future can be made for given areas of interest. In an embodiment, areas can be pre-treated before diseases actually appear in intensity calculations.

One skilled in the art will appreciate that as soon as one wants to use the trained network for future considerations, the amount of data generated can grow exponentially. ARDCs offer an elegant solution to the problem of traditional database calls or reel-to-reel scanner storage. Therefore, embodiments offer improvements to traditional raster image processing and storage.

In an embodiment, the temporal aspect of vectors allow for time-based considerations to be input as layers into an ARDC. For example, consider a traditional ink blot on paper in which the blot at time 0 would be substantially smaller than the same blot at time 1 or time 2 as the ink spreads over the paper. Similarly, diseases can likewise grow. In embodiments, a stress vector can therefore be generated for each potential condition that captures the pixel intensities for a given layer as described above, but aggregates the intensity measurements over time as the disease is calculated to spread.

In a related embodiment, an image capture device, such as a thermal camera, can be used to capture thermal image data for a given agricultural area on sequential days (e.g. 0 to 5) that capture the change in an area of interest over time (e.g. pixel intensity increasing or surrounding pixel intensity increasing). In an embodiment, each raster captured on days 0 to 5 can be used in an ARDC. However, in another embodiment, a delta raster incorporating the changes at each pixel as intensity levels can be created from base rasters of days 0 to 5 and used as its own layer in an ARDC.

As mentioned above, data stored within the multiple data cube layers can be read, processed, and held in an intermediate format that can be manipulated and passed to a collection of parallel ANN processors. Each ANN processor is an 'M' input and 'N' output processor that processes the collection of data elements lying along a 'vertical' that passes through the raster cell in each layer within the ARDC. For example, referring to FIG. 7, an exploded view of a raster vertical vector 700 is depicted, according to an embodiment.

Each raster 702, 704, and 706 represents a pixelated view of various parameters, i.e. moisture, thermal intensity, etc. across a region of interest. In an embodiment, rasters 702, 704, and 706 are geo-referenced. Therefore, pixels that lie on a vertical represent the values of the parameter associated with that raster at the same location. Such Raster Vertical Vectors (RVV) capture the conditions across a number of parameters equal to the number of rasters in the ARDC. So, for the 'M' layers of rasters held within the ARDC, each vertical, that identifies the same relative cell, contains 'M' values. Each vertical of 'M' values can be considered an input vector that can be passed to an ANN. The ANN will then generate 'N' values. Each value represents the probability of a particular type of stress or disease present in the raster associated with the input vector to the network. For example, referring to FIG. 8, a graphical view of various example stresses in space is depicted, according to an embodiment.

Figure 8:
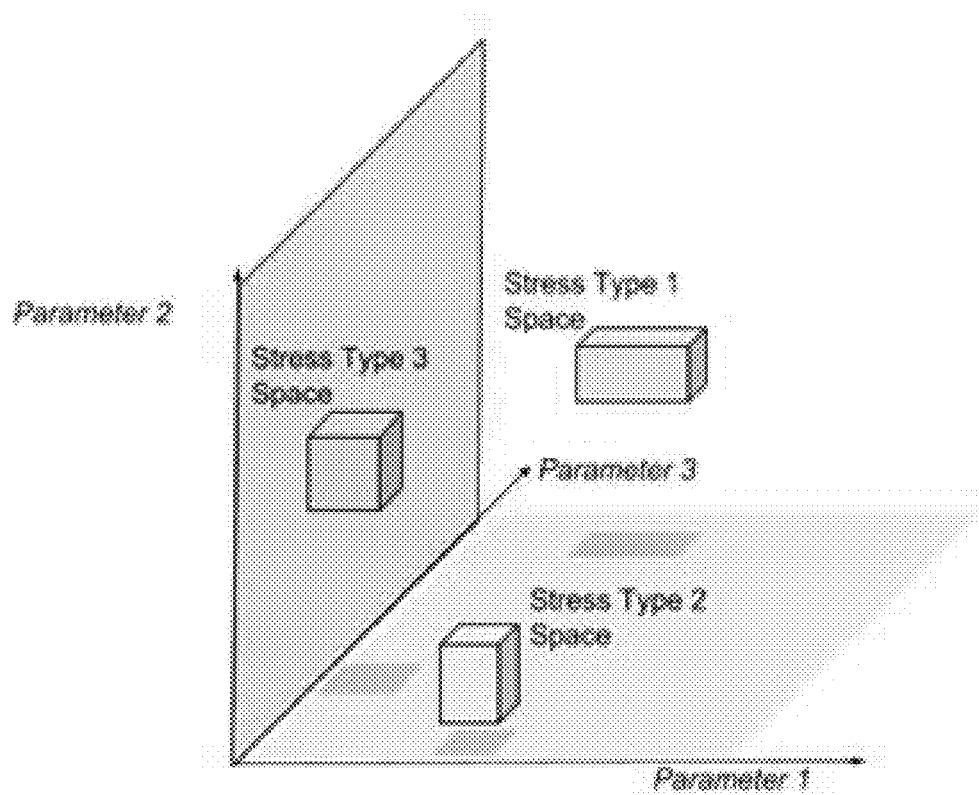
FIG. 8 is a graphical view of various example stresses in space, according to an embodiment.

An ANN can learn to associate a set of similar RVVs with a given vegetative stress type. In FIG. 8, each particular stress type (Stress Type 1, Stress Type 2, and Stress Type 3) for the parameters mapped (Parameter 1, Parameter 2, Parameter 3) are illustrated. Once the ANN has been trained, the network can be saved as an FPGA IP block.

Estimation of the various types of stresses can start by extracting each RVV for the ARDC. The RVVs are then concatenated into an array. The array is then passed to a processing unit where a subset of RVVs from the array are passed simultaneously to an FPGA which contains multiple copies of the ANN that has been realized as an FPGA IP block. In an embodiment, because the trained network can be placed in an FPGA IP core, with several cores on an FPGA medium, the cube data can be evaluated in parallel. Loading FPGA can be conducted via software after learning is conducted in certain embodiments.

Each block instance of the ANN produces a probability value for each of the 'N' types of stress for which the ANN has been trained. Each of these 'N' values is then collected and used to populate the appropriate cell position in the raster associated with each of the 'N' stresses. The 'N' stress rasters can be reviewed and the appropriate treatments determined and planned. The particular type and location of treatment can be stored in a raster aligned with the stress raster. Such treatment rasters can then be used by automated applicators to determine where to apply the desired treatment.

In an embodiment, trained networks can be different (e.g. location). For example, one raster layer can comprise location information, such as a region. In an embodiment, another raster layer can comprise latitude/longitude of a golf course. In further embodiments, the trained network is specific to a particular golf course. In further embodiments, the network can be trained for only the playable golf course area itself, and not cart paths, ponds, or out of bounds and unplayable areas. For example, a mask raster can allow a user to deselect areas that they are not interested in.

The spatial growth of stressed regions can be approximated by estimating a "growth-vector." In an embodiment, a growth-vector is calculated such that it represents the expansion of a stressed region's growth all along the perimeter pixels of a binarized image representing the stressed region. More specifically, the growth outward from each perimeter pixel of a region of interest is measured day-over-day by determining the average magnitude and direction of growth at that perimeter pixel relative to the surrounding pixels. New growth is represented by the difference of the two days' binarized images. Similarly, if the magnitude of a vector is negative, it would indicate a contraction in spatial area. In embodiments, negative vector indications can be used to measure treatment success. A negative magnitude indicates that the region is shrinking (and potentially healing).

Figures 9A, 9B, 9C:
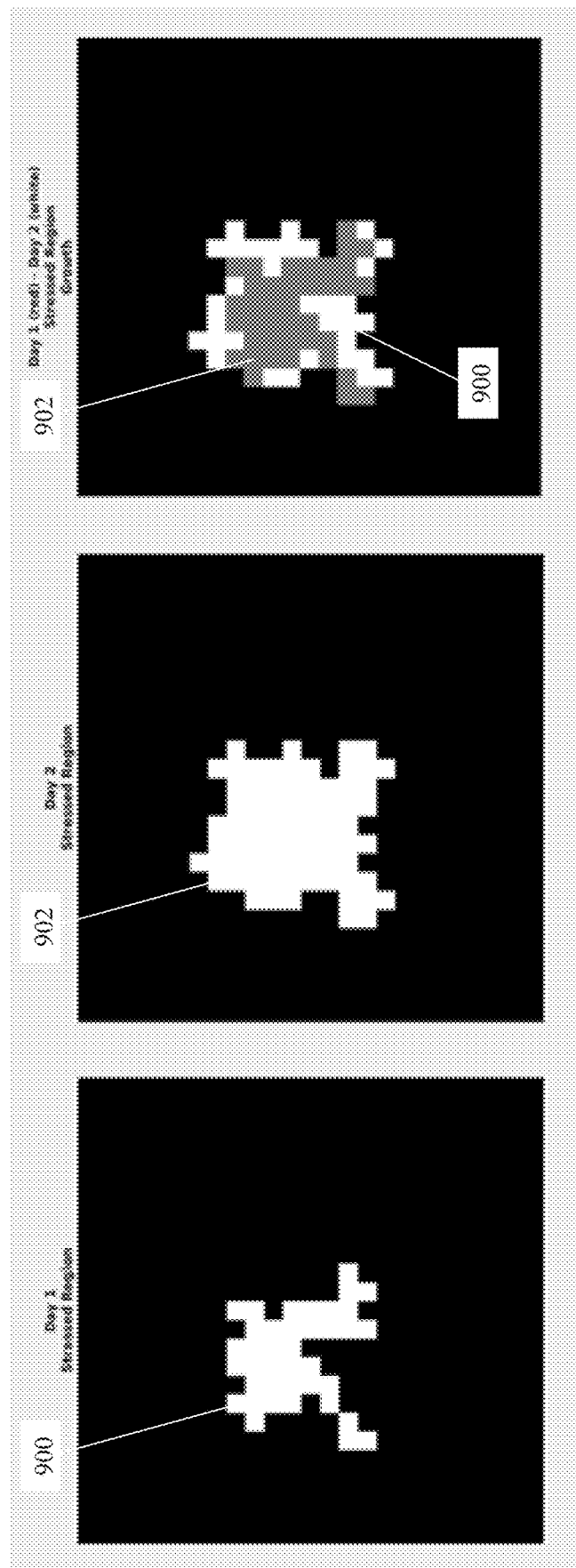
FIGS. 9A-9C are binarized images illustrating the growth of a stressed region over time, according to embodiments.

For example, referring to FIGS. 9A-9C, binarized images illustrating the growth of a stressed region over time are depicted, according to embodiments. In particular, FIG. 9A depicts a stressed region 900 on Day 1. FIG. 9B depicts the same stressed region 902 having expanded on Day 2. FIG. 9C depicts stressed region 900 (now shaded) overlaid on stressed region 902 on Day 2. As shown, the region grows in a non-uniform fashion, growing outward at different rates relative to the location along the perimeter.

Accordingly, by calculating the average vector of expansion from each perimeter location, an extrapolation from Day 2 can be made using the approximated growth vector to provide an estimate of the area covered by the stressed region at a future point in time, such as Day 3. For example, FIGS. 10A-10B are the binarized images illustrating the growth of a stressed region over time of FIGS. 9A-9C with growth vectors depicted, according to embodiments.

Figures 10A, 10B, 10C:
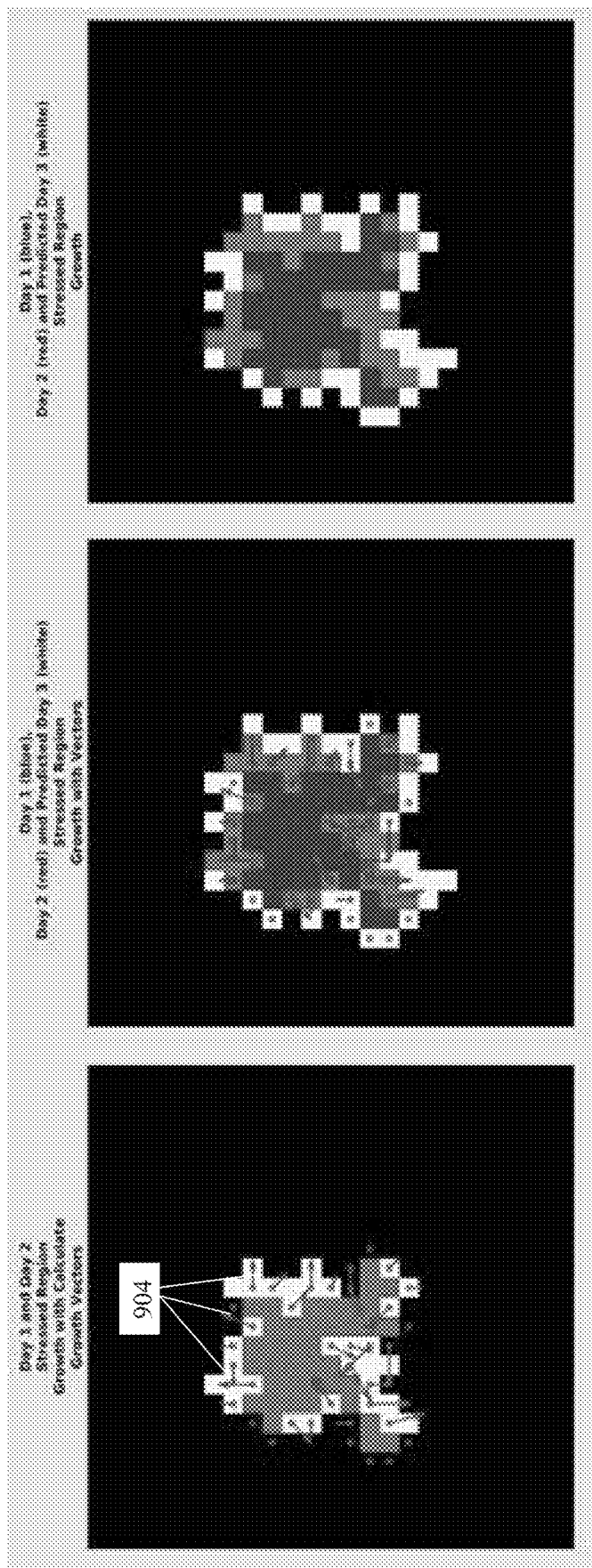
FIGS. 10A-10B are binarized images illustrating the growth of a stressed region over time of FIGS. 9A-9C with growth vectors, according to embodiments.
FIG. 10C is a binarized image of a future prediction for the stressed regions of FIGS. 9A-9C, according to an embodiment.

In particular, FIG. 10A depicts Day 1 (light shading) overlaid on Day 2 (white), with growth vectors 904. Each growth vector 904 can include a beginning pixel, direction, and magnitude shown by the length of the arrow on an ending pixel. Accordingly, the relative growth of each vector outward from each beginning pixel to each ending pixel is presented. Not all growth vectors 904 are labeled for ease of illustration.

FIG. 10B depicts Day 1 (dark shading) overlaid on Day 2 (light shading), all overlaid on predicted Day 3 (white), again with growth vectors. FIG. 10C is a binarized image of a future prediction for the stressed regions of FIGS. 9A-9C, according to an embodiment. In particular, FIG. 10C depicts Day 1 (dark shading) overlaid on Day 2 (light shading), all overlaid on predicted Day 3, without growth vectors.

Figure 11A:
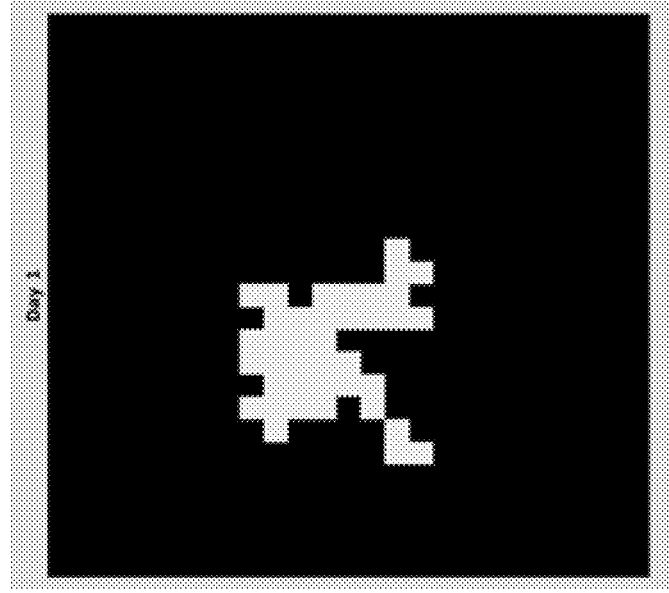
FIGS. 11A-11C are the binarized images of the stressed region of FIGS. 9A and 9B and the future prediction of FIG. 10C without overlay, according to embodiments.
Figure 11B:
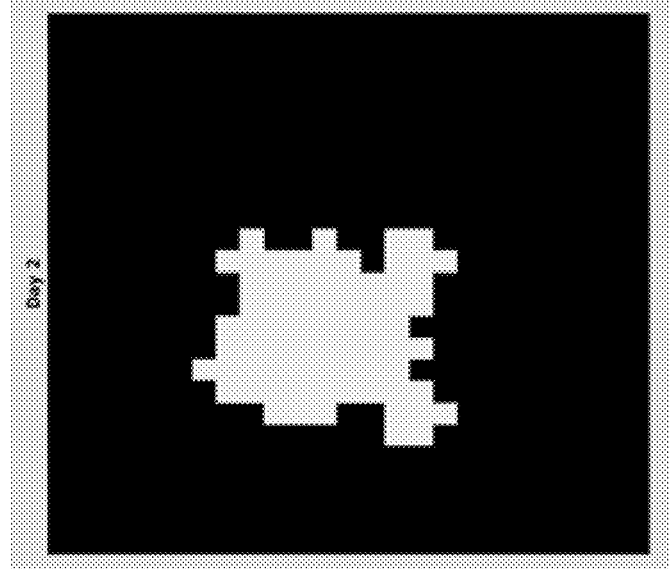
Figure 11C:
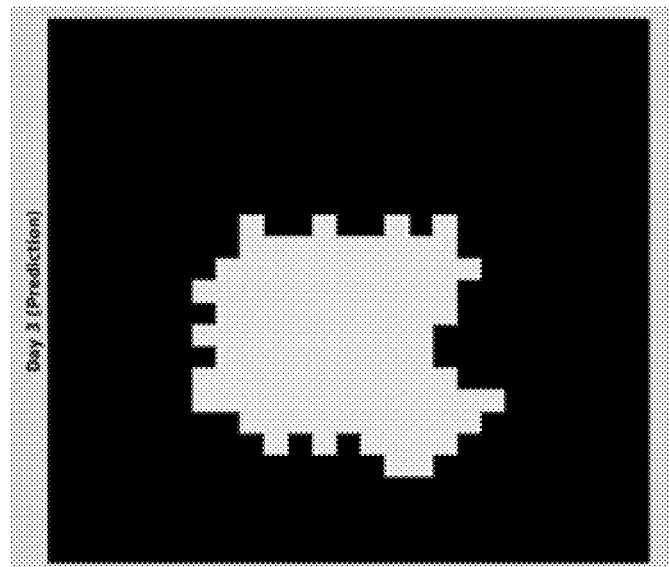

Referring to FIGS. 11A-11C, the binarized images of the stressed region of FIGS. 9A and 9B and the future prediction of FIG. 10C without overlay are depicted for clarity, according to embodiments. Thus, the growth from Day 1 to Day 2 can be modeled such that a reasonable expectation of Day 3 can be calculated.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for optimizing the application of one or more treatments to an agricultural area, the system comprising:
   a learning engine comprising instructions that, when implemented by a processor operably coupled to memory, cause the processor to:
      receive a plurality of training raster images each having a plurality of pixels, the plurality of training raster images including a set of parameters corresponding to a set of intersection points of each training raster image at each relative pixel location,
      learn a relationship between the set of parameters and at least one biological stress, and
      output a probability of the at least one biological stress for each of the set of intersection points in the training raster images as a trained learning engine output;
   a first remote data capture device configured to capture data related to the agricultural area in a first raster image;
   a second remote data capture device configured to provide data related to the agricultural area in a second raster image;
   a data cube storage configured to store the first raster image and the second raster image in an agricultural raster data cube, the agricultural raster data cube including a set of detected parameters corresponding to a set of intersection points of the first raster image and the second raster image at each relative pixel location; and
   an application engine comprising instructions that, when implemented by a processor operably coupled to memory, cause the processor to:
      receive the trained learning engine output,
      determine a probability of disease based on the set of detected parameters in the agricultural raster data cube for each pixel location and the probability of the at least one biological stress for each of the set of intersection points in the trained learning engine output, and
      output a proposed treatment raster specifying an amount of at least one of the treatments for at least some of the pixel locations.

2. The system of claim 1, further comprising a precision applicator configured to apply the at least one of the treatments to the agricultural area according to the proposed treatment raster as provided in a format specific to the precision applicator for each of the at least some of the pixel locations.

3. The system of claim 2, wherein an actual treatment raster is generated based on the application of the at least one of the treatments to the agricultural area by the precision applicator and added to the agricultural raster data cube.

4. The system of claim 1, wherein the first raster image and the second raster image are georeferenced to the same physical location.

5. The system of claim 4, wherein the data cube storage further comprises a second agricultural raster data cube proximate the georeferenced location of the agricultural raster data cube, and wherein the agricultural raster data cube comprises raster images at a first precision and the second agricultural raster data cube comprises raster images at a second precision, the second precision being more accurate than the first precision.

6. The system of claim 1, wherein the first remote data capture device is positioned on an unmanned aerial vehicle.

7. The system of claim 1, wherein the second remote data capture device is a ground-based remote sensor.

8. The system of claim 1, wherein the first remote data capture device is configured to capture the same agricultural area in a first image at a first time and a second image at a subsequent second time and the learning engine is further configured to calculate a stress vector that represents a prediction of the at least one biological stress based on the first image and the second image.

9. The system of claim 8, wherein the proposed treatment raster pre-treats the at least one biological stress with the proposed treatment raster.

10. The system of claim 1, wherein the first raster image and the second raster image are stored in the agricultural raster data cube as delta values.

11. A method for optimizing the application of one or more treatments to an agricultural area, the method comprising:
training a machine learning network with a plurality of training raster images each having a plurality of pixels, the plurality of training raster images including a set of parameters corresponding to a set of intersection points of each training raster image at each relative pixel location,
training the machine learning network with a plurality of known diseases, including learning a relationship between the set of parameters and at least one biological stress, and output a probability of the at least one biological stress for each of the set of intersection points in the training raster images as a trained machine learning network output;
capturing a plurality of raster images using one or more image capture devices;
providing a plurality of raster images based on one or more remote sensing devices;
storing the plurality of raster images as an agricultural raster data cube in a data cube storage, the agricultural raster data cube including a set of detected parameters corresponding to a set of intersection points of the plurality of raster images at each relative pixel location;
determining a probability of disease for each pixel location in the agricultural raster data cube based on the set of detected parameters and the probability of the at least one biological stress for each of the set of intersection points in the trained machine learning network output, and
outputting a proposed treatment raster specifying an amount of treatment material for each pixel in a precision applicator format.

12. The method of claim 11, further comprising applying the one or more treatments to the agricultural area according to the proposed treatment raster.

13. The method of claim 12, further comprising:
generating an actual treatment raster based on an application of the one or more treatments, and
adding the actual treatment raster to the agricultural raster data cube.

14. The method of claim 11, wherein the plurality of raster images are georeferenced to the same physical location.

15. The method of claim 14, further comprising storing a second agricultural raster data cube proximate the georeferenced location of the agricultural raster data cube, and wherein the agricultural raster data cube comprises raster images at a first precision and the second agricultural raster data cube comprises raster images at a second precision, the second precision being more accurate than the first precision.

16. The method of claim 11, wherein the one or more image capture devices is positioned on an unmanned aerial vehicle.

17. The method of claim 11, wherein the one or more remote sensing devices is a ground-based remote sensor.

18. The method of claim 11, wherein capturing a plurality of raster images using one or more image capture devices includes:
capturing the same agricultural area in a first image at a first time and a second image at a subsequent second time; and
calculating a stress vector that represents a prediction of at least one of the plurality of known diseases based on the first image and the second image.

19. The method of claim 18, further comprising pre-treating the predicted at least one of the plurality of known diseases with the proposed treatment raster.

20. The method of claim 11, wherein storing the plurality of raster images as an agricultural raster data cube further comprises storing the first raster image and the second raster image as delta values.

* * * * *